(12) United States Patent
Zand et al.

(10) Patent No.: US 11,064,454 B2
(45) Date of Patent: Jul. 13, 2021

(54) PHASE-BASED GROUP RANGING

(71) Applicant: Stichting IMEC Nederland, Eindhoven (NL)

(72) Inventors: Pouria Zand, Eindhoven (NL); Jac Romme, Schiedam (NL)

(73) Assignee: IMEC vzw, Leuven (BE)

( * ) Notice: Subject to any disclaimer, the term of this patent is extended or adjusted under 35 U.S.C. 154(b) by 0 days.

(21) Appl. No.: 16/721,351

(22) Filed: Dec. 19, 2019

(65) Prior Publication Data

US 2020/0205118 A1 Jun. 25, 2020

(30) Foreign Application Priority Data

Dec. 19, 2018 (EP) ..................................... 18213977

(51) Int. Cl.
*H04W 64/00* (2009.01)
*H04W 72/04* (2009.01)
(Continued)

(52) U.S. Cl.
CPC ........... *H04W 64/003* (2013.01); *G01S 13/84* (2013.01); *H04W 72/044* (2013.01); *H04W 74/04* (2013.01)

(58) Field of Classification Search
CPC . H04W 64/003; H04W 72/044; H04W 74/04; G01S 13/84; H04B 17/27
See application file for complete search history.

(56) References Cited

U.S. PATENT DOCUMENTS

2005/0228613 A1\* 10/2005 Fullerton .............. G01S 5/0289
342/458
2012/0120834 A1 5/2012 Sugar et al.
(Continued)

FOREIGN PATENT DOCUMENTS

GB 1486319 9/1977
WO 2018/156862 A1 8/2018

OTHER PUBLICATIONS

European Search Report, European Patent Application No. 18213977.4, dated May 28, 2019, 13 pages.
(Continued)

*Primary Examiner* — Joseph E Dean, Jr.
(74) *Attorney, Agent, or Firm* — McDonnell Boehnen Hulbert & Berghoff LLP (57) ABSTRACT

A method is disclosed for group ranging in a wireless network. The wireless network comprises a plurality of nodes, including an initiator node and a plurality of responder nodes. The method includes performing, for each frequency in a plurality of frequencies, a measurement procedure involving a two-way phase measurement between the initiator node and each of the responder nodes. The measurement procedure includes the initiator node transmitting a carrier signal having the frequency, each responder node of the plurality of responder nodes receiving and performing a phase measurement of the carrier signal, each responder node of the plurality of responder nodes transmitting a carrier signal having the frequency, and the initiator node receiving and performing a phase measurement of the carrier signal. The method further includes calculating, between the initiator node and each responder node of the plurality of responder nodes, a distance, based on the performed two-way phase measurements.

20 Claims, 5 Drawing Sheets

(51) Int. Cl.
*G01S 13/84* (2006.01)
*H04W 74/04* (2009.01)

(56) References Cited

U.S. PATENT DOCUMENTS

| | | |
|---|---|---|
| 2014/0087757 A1 | 3/2014 | Reimann |
| 2014/0192789 A1* | 7/2014 | Bernhard ............ H04W 72/044 370/336 |
| 2018/0077589 A1* | 3/2018 | Jarvis .................... H04W 24/10 |
| 2018/0249437 A1* | 8/2018 | Lindskog .............. H04W 64/00 |

OTHER PUBLICATIONS

Olafsdottir, Hildur et al., "On the Security of Carrier Phase-Based Ranging, International Conference for Cryptologic Hardware and Embedded Systems", 2017, pp. 490-509.

Olafsdottir, Hildur et al., "On the Security of Carrier Phase-Based Ranging", arXiv:1610.06077v1 [cs.CR], Oct. 19, 2016, pp. 1-14.

Kluge, Wolfram et al., "Proposal of Ranging Capabilities with PHY Supporting CMB", Project: IEEE P.802.15 Working Group for Wireless Personal Area Networks (WPANs), IEEE802.15-13-0054-01-004N, Jan. 14, 2013, pp. 1-15.

Kluge, Wolfram et al., "Ranging with IEEE 802.15.4 Narrow-Band PHY", Project: IEEE P802.15 Working Group for Wireless Personal Area Networks (WPANs), IEEE 802.15-09-0613-01-004f, Sep. 14, 2009, 21 pages.

Liu, Yue et al., "A Phase-Based Ranging Method for Fast Frequency Hopping System", 2014 Sixth International Conference on Wireless Communications and Signal Processing (WCSP), 2014, 5 pages.

Ryoo, Jihoon et al., "Phase-Based Ranging of RFID Tags With Applications to Shopping Cart Localization", Proceedings of the 18th ACM International Conference on Modeling, Analysis and Simulation of Wireless and Mobile Systems, Nov. 2-6, 2015, pp. 245-249.

"Accurate & Secure Distance Measurement With Bluetooth", IMEC, www.imec-int.com, 2 pages.

Xu, Bing et al., "Efficient Range Estimation in Beat Radio Interferometry", IEEEAccess, vol. 5, Apr. 24, 2017, pp. 3834-3840.

Xu, Bing et al., "Holographic Radio Interferometry for Target Tracking in Dense Multipath Indoor Environments", 2017 9th International Conference on Wireless Communications and Signal Processing (WCSP). IEEE, 2017, 6 pages.

Yuan, En et al., "Ranging Method for Navigation Based on High-Speed Frequency-Hopping Signal", IEEEAccess, vol. 6, Feb. 28, 2018, pp. 4308-4320.

* cited by examiner

PHASE-BASED GROUP RANGING

CROSS-REFERENCE TO RELATED APPLICATIONS

The present application is a non-provisional patent application claiming priority to EP Application No. EP 18213977.4, filed on Dec. 19, 2018, the contents of which are hereby incorporated by reference.

FIELD OF THE DISCLOSURE

The present disclosure relates to methods for group ranging in a wireless network, and to wireless network nodes configured to participate in group ranging.

BACKGROUND

Typical ranging systems and methods involve determining the distance between wireless network nodes. Implementations of phase-based ranging methods can beneficially use course clock synchronization between participating wireless network nodes, and can be relatively resilient against multipath fading.

Typically, phase-measurements are performed in narrowband channels, allowing the use of low-cost transceivers, at different closely separated frequencies, to eliminate or at least mitigate effects of phase ambiguity, and over a wide frequency band, e.g., 80 MHz at 2.4 GHz, to eliminate or at least mitigate effects of multipath fading.

In such methods, typically, an initiator node transmits a carrier signal to a responder node (also known as a reflector node). The responder node performs a phase measurement and then sends back a carrier signal on the same frequency to the initiator, which in turn performs a phase measurement. This is repeated for a plurality of frequencies.

The phase measured at the reflector node relative to its own local oscillator signal phase may be sent back to the initiator, so that the initiator can use it as a correction factor when calculating the distance between the two nodes. Such a method is disclosed in W. Kluge and D. Eggert, "Ranging with IEEE 802.15.4 narrowband PHY", September 2009, https://mentor.ieee.org/802.15/dcn/09/15-09-0613-01-004franging-with-ieee-802-15-4-narrow-band-phy.ppt.

Alternatively, the responder node can lock its local oscillator to the received carrier from the initiator node, so that the phase of which is reflected in the carrier signal transmitted by the responder. Such a method is disclosed in Hildur Olafsdóttir, Aanjhan Ranganathan, and Srdjan Capkun: "On the Security of Carrier Phase-based Ranging", International Conference on Cryptographic Hardware and Embedded Systems, Springer, Cham, 2017.

SUMMARY

An objective of the present disclosure is to provide a fast phase-based ranging method that is suitable for group ranging, including dynamic scenarios.

According to a first aspect, there is provided a method for group ranging in a wireless network, the wireless network comprising a plurality of nodes, the plurality of nodes for the purposes of the method including an initiator node and a plurality of responder nodes, the method comprising performing, as a whole, in sequence in time, for each frequency in a plurality of frequencies, a measurement procedure involving a two-way phase measurement between the initiator node and each of the responder nodes, the measurement procedure comprising: the initiator node transmitting a carrier signal having the frequency, each responder node of the plurality of responder nodes receiving and performing a phase measurement of the carrier signal; and each responder node of the plurality of responder nodes, during a respective defined timeslot, transmitting a carrier signal having the frequency, the initiator node receiving and performing a phase measurement of the carrier signal; the method further comprising: calculating, between the initiator node and each responder node of the plurality of responder nodes, a distance, based on the performed two-way phase measurements involving the initiator node and the responder node.

With "initiator node" should be understood a node that performs the first carrier transmission during the measurement procedure, regardless of whether a decision to start the measurement procedure or the ranging originated in that node or elsewhere.

With "carrier signal" should be understood a continuous-wave sinusoidal oscillation with a single frequency-component (neglecting harmonics and other imperfections). Such a signal may typically originate directly from the local oscillator (LO) of the transmitting node. However, as an example, it can also be obtained by applying a constant modulation, such as a frequency shift keying (FSK) modulation with a constant input (all 1s or 0s).

Typically, the phase measurement at the responder node is made with respect to the responder node's LO, which is also used for generating the carrier signal transmitted by the responder node. Likewise, typically, the phase measurement at the initiator node is made with respect to the initiator node's LO, which is used for generating the carrier signal transmitted by the initiator node.

In many wireless standards, such as Bluetooth Low Energy (BLE) or Time Slotted Channel Hopping (TSCH), frequency channel switching, which may be based on pseudo-random channel hopping, is slow, or may only be performed after a certain time. For example, in the BLE standard, hopping from one frequency channel to the next might may take at least 7.5-10 ms, meaning, for example, that a single ranging procedure over an entire 80 MHz frequency band with 40 frequency channels will take at least 300-400 ms. Alternatively, or additionally, channel switching may be slow due to hardware constraints due to there being a time delay when setting up a new frequency channel when performing channel hopping. This time delay may vary depending on the implementation of the specific radio used. In many cases, these delays will dominate the total time required for a ranging procedure between two nodes.

These effects are amplified if group ranging, i.e., determining distances between several transceivers, is to be performed between a large number of nodes or repeated several or many times in a dynamic scenario, for example with moving nodes, if the ranging is performed with respect to one individual node after the other.

By performing the measurement procedure, as a whole, in sequence in time, for each frequency, before switching to the next one, the number of frequency changes is minimized. In particular, only one frequency change to each frequency used is needed. Minimizing the number of frequency changes in the system typically leads to a considerable speed-up of the method for group ranging, making phase-based group ranging using multiple frequency carriers feasible under those conditions.

Further, since the initiator node will only transmit its carrier signal once on each frequency, with all responder nodes receiving that signal—utilizing the broadcast nature of radio signals—the number of transmissions made by the initiator node is reduced, thus saving power.

The defined time slots may be defined either through central assignment, through distributed calculation using some property of the node, such as a hardware or MAC address and/or handled through a collision avoidance scheme. The phase measurements may for example be performed by collecting real (I) and imaginary (Q) samples from the received carrier.

According to an embodiment, the measurement procedure further involves a two-way phase measurement between each responder node and each other responder node of the plurality of nodes and further comprises, during each responder node of the plurality of responder nodes transmitting the carrier signal, each other responder node of the plurality of responder nodes receiving and performing a phase measurement of the carrier signal from the responder node, the method further comprising: calculating between each responder node and each other responder node of the plurality of nodes, a distance, based on the performed two-way phase measurement involving the responder node and the other responder node. Thus, during each responder node of the plurality of responder nodes transmitting the carrier signal, the responder node broadcasts the signal to each other responder node of the plurality of responder nodes.

In this way, group ranging between all participating nodes may be performed in a very time-efficient way, since each participating node will only have to transmit its carrier signal once, utilizing the broadcast nature of radio signals, wherein more than one node can receive the carrier signal and measure its phase at the same time. Even though ranging is performed between all combinations of the participating nodes, still, only one frequency change to each used frequency is needed.

According to an embodiment, during each responder node of the plurality of responder nodes transmitting the carrier signal, the initiator node, exclusively among the plurality of nodes, receives and performs the phase measurement of the carrier signal. Thus, the responder node unicasts the carrier signal to the initiator node.

This allows for a method with less complexity if only the distances between the initiator node and each of the responder nodes is required, or when it can be tolerated to repeat the procedure with each other node acting as initiator node.

According to an embodiment, during the initiator node transmitting the carrier signal, each of the responder nodes locks its local oscillator, LO, to the signal based on the phase measurement.

This will result in that both the phase and frequency of the carrier signal transmitted by the responder node will be equal to that of the received carrier signal from the initiator node at the point of reception. This removes the need to propagate the result of the phase measurement at the responder node back to the initiator node. Rather, since the phase of the carrier signal received at the responder node will be identical to the phase of the carrier signal transmitted by the responder node, the phase measurement performed at the initiator node will directly reflect the round-trip phase advance between the initiator node and the responder node.

According to an embodiment, immediately ahead of each defined timeslot, the initiator node retransmits the carrier signal. This minimizes any effect of phase drift or phase noise of the respective local oscillators on the two-way phase measurement, since the carrier signal from the responder node is transmitted directly after the phase measurement performed by the responder node, leading to a more accurate measurement of the round-trip phase advance.

According to an embodiment, the respective defined timeslot is assigned by an assigning node, such as the initiator node, and communicated to the responder nodes. This makes sure that there will be no collisions in transmission, as each responder node will only transmit in its assigned timeslot, leading to a system having a deterministic time behavior for performing the method for group ranging.

According to an embodiment, the respective defined timeslot is defined based on a hardware address of the responder node. This allows for the assigning of timeslots without the need of central coordination, leading to less management overhead in the form of extra transmissions to assign timeslots.

According to an embodiment, use of the respective defined timeslot is based on a collision-handling scheme, such as a Slotted-Aloha scheme. This also allows for the assigning of timeslots without the need of central coordination.

According to an embodiment, the setting of each frequency of the plurality of frequencies is performed in a MAC layer and/or a data-link layer of the wireless network. The setting of each frequency may for example be based on pseudo-random channel hopping. Such networks typically have long frequency switching times and thus particularly benefit from the reduced number of frequency switches resulting from this method for group ranging.

According to an embodiment, the wireless network is a Bluetooth Low Energy, BLE, network or a Time Slotted Channel Hopping, TSCH, network. Such networks typically have long frequency switching times and thus particularly benefit from the reduced number of frequency switches resulting from this method for group ranging.

According to a second aspect, there is provided a method of group ranging in a wireless network, the method comprising: performing, as a whole, in sequence in time, for each frequency in a plurality of frequencies, a measurement procedure comprising: an initiator node of the wireless network transmitting a carrier signal having the frequency; and the initiator node receiving from each responder node of a plurality of responder nodes in the wireless network, during a respective defined timeslot, a carrier signal having the frequency, the initiator node performing a phase measurement of the carrier signal.

According to an embodiment, the initiator node may receive a phase measurement of the carrier signal for each frequency of the plurality of frequencies from each responder node of the plurality of responder nodes.

According to an embodiment, the initiator node may calculate, between the initiator node and each responder node of the plurality of responder nodes, a distance, based on the performed two-way phase measurements involving the initiator node and the responder node.

According to an embodiment, the initiator node may communicate the phase measurement of the carrier signal from each responder node of the plurality of responder nodes for each frequency of the plurality of frequencies to a distance-calculating node.

Effects and features of this second aspect are largely analogous to those described above in connection with the first aspect. Embodiments mentioned in relation to the first and second aspects are largely compatible with this second aspect.

According to a third aspect, there is provided a wireless network node configured to participate in a group ranging procedure in a wireless network, the wireless network node being configured to: perform, as a whole, in sequence in time, for each frequency in a plurality of frequencies, a measurement procedure comprising: transmitting a carrier signal having the frequency; receiving from each responder node of a plurality of responder nodes in the wireless network, during a respective defined timeslot, a carrier signal having the frequency and performing a phase measurement of the carrier signal.

According to an embodiment, the initiator node may further be configured to receive a phase measurement of the carrier signal for each frequency of the plurality of frequencies from each responder node of the plurality of responder nodes.

According to an embodiment, the initiator node may further be configured to calculate, between the initiator node and each responder node of the plurality of responder nodes, a distance, based on the performed round-trip phase measurements involving the initiator node and the responder node According to an embodiment, the initiator node may further be configured to communicate the phase measurement of the carrier signal from each responder node of the plurality of responder nodes for each frequency of the plurality of frequencies to a distance-calculating node.

Effects and features of this third aspect are largely analogous to those described above in connection with the first aspect. Embodiments mentioned in relation to the first aspect are largely compatible with this third aspect.

According to a fourth aspect, there is provided a method of group ranging in a wireless network, the method comprising: performing, as a whole, in sequence in time, for each frequency in a plurality of frequencies, a measurement procedure comprising: a responder node of the wireless network receiving from an initiator node of the wireless network a carrier signal having the frequency, the responder node performing a phase measurement of the carrier signal; and the responder node, during a respective defined timeslot, transmitting a carrier signal having the frequency.

According to an embodiment, the responder node may communicate the phase measurement of the carrier signal for each frequency of the plurality of frequencies to a distance-calculating node.

According to an embodiment, the responder node may communicate the phase measurement of the carrier signal for each frequency of the plurality of frequencies to the initiator node.

Effects and features of this fourth aspect are largely analogous to those described above in connection with the first aspect. Embodiments mentioned in relation to the first aspect are largely compatible with this fourth aspect.

According to a fifth aspect, there is provided a wireless network node configured to participate in a group ranging procedure in a wireless network, the wireless network node being configured to: perform, as a whole, in sequence in time, for each frequency in a plurality of frequencies, a measurement procedure comprising: receiving from an initiator node of the wireless network a carrier signal having the frequency and performing a phase measurement of the carrier signal; and during a respective defined timeslot, transmitting a carrier signal having the frequency.

According to an embodiment, the responder node may be configured to communicate the phase measurement of the carrier signal for each frequency of the plurality of frequencies to the initiator node.

According to an embodiment, the responder node may be configured to communicate the phase measurement of the carrier signal for each frequency of the plurality of frequencies to a distance-calculating node.

Effects and features of this fifth aspect are largely analogous to those described above in connection with the first aspect. Embodiments mentioned in relation to the first aspect are largely compatible with this fifth aspect.

According to a sixth aspect, there is provided a system, comprising a wireless network node according to the third aspect and a plurality of wireless network nodes according to the fifth aspect.

Effects and features of this sixth aspect are largely analogous to those described above in connection with the first aspect. Embodiments mentioned in relation to the first aspect are largely compatible with this sixth aspect.

BRIEF DESCRIPTION OF THE FIGURES

The above, as well as additional, features will be better understood through the following illustrative and non-limiting detailed description of example embodiments, with reference to the appended drawings. In the drawings like reference numerals will be used for like elements unless stated otherwise.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 2:
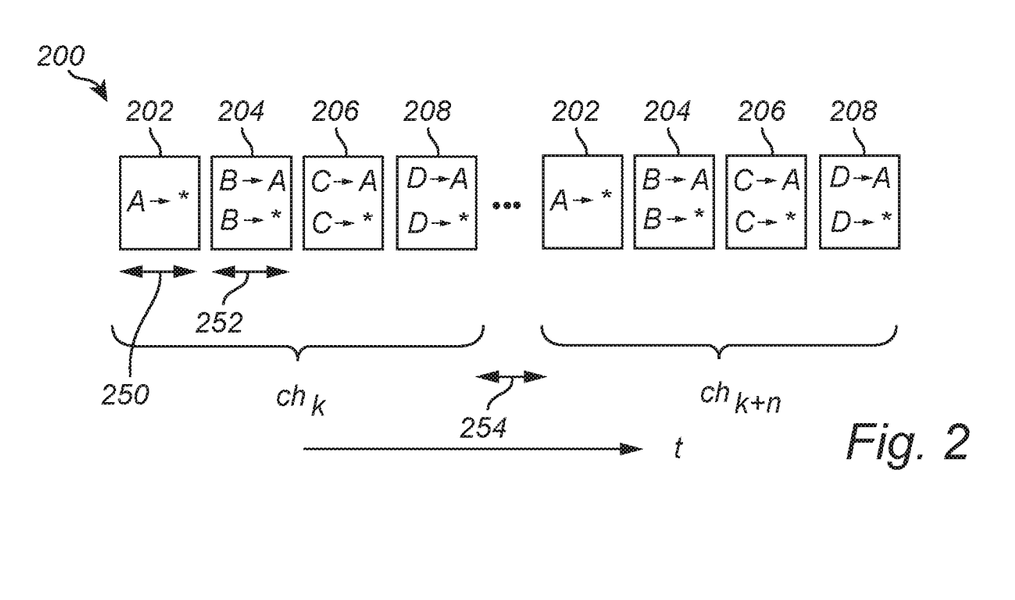
FIG. 2 shows schematically timing sequences of a first and a third ranging method, according to an example embodiment.
Figure 3:
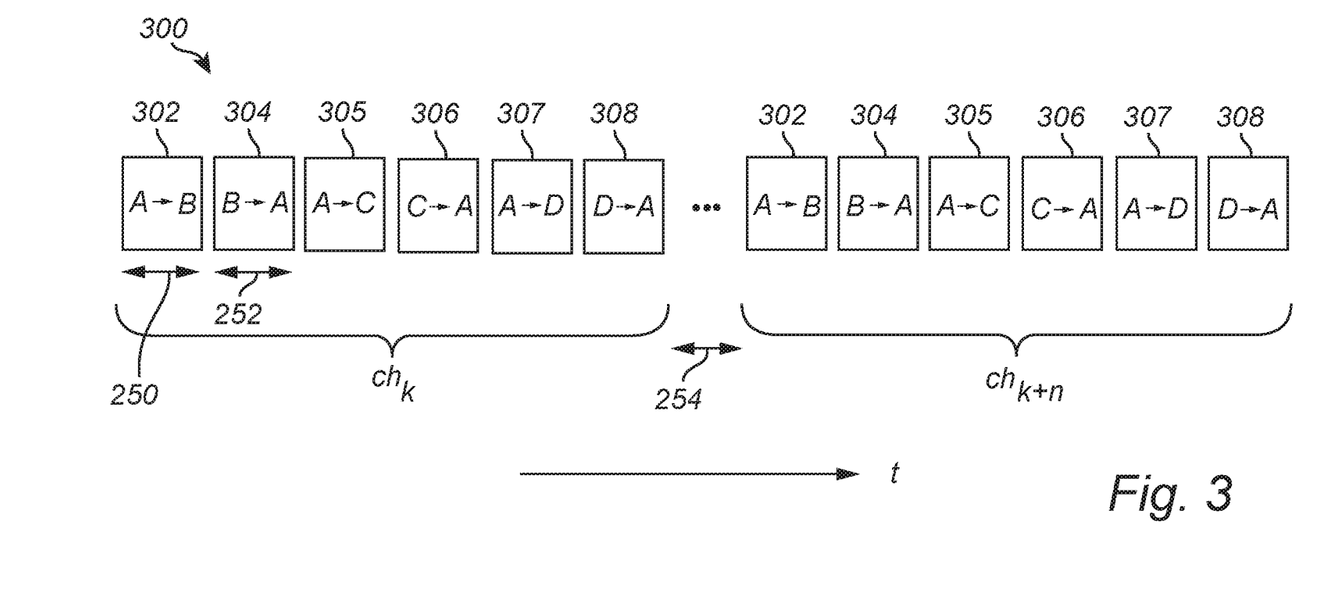
FIG. 3 shows schematically the timing sequence of a second ranging method, according to an example embodiment.
Figure 4:
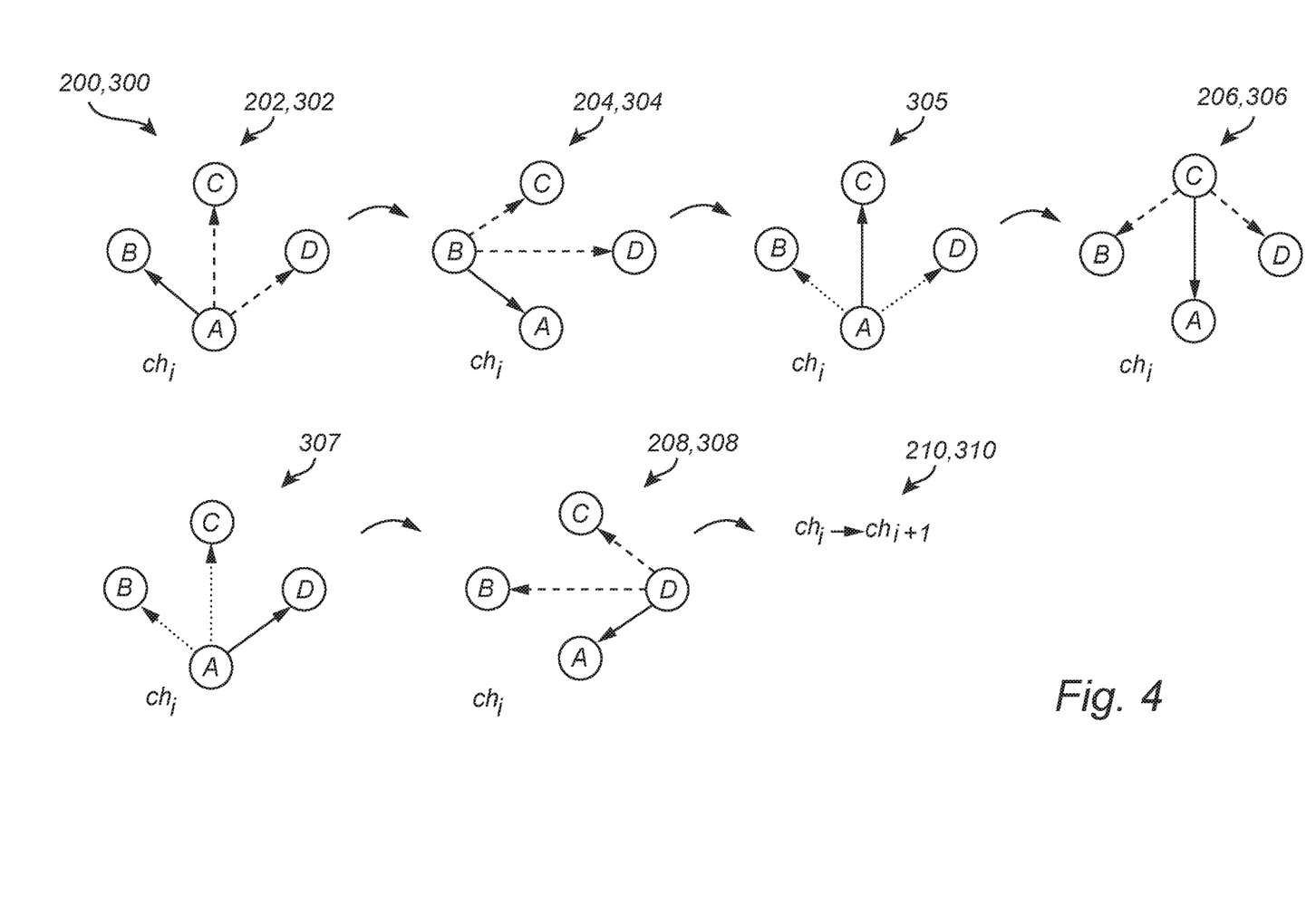
FIG. 4 illustrates the transmission pattern of the first, second, and third ranging method, according to an example embodiment.

FIGS. 2, 3, and 4 illustrate ranging method examples 200, 300, which all are phase-based techniques, implemented in a wireless network comprising a plurality of nodes, which for the purposes of the methods are divided into an initiator node, which performs the first ranging transmission, and a number of responder nodes. The initiator node transmits a carrier signal, i.e., a constant tone, generated by its local oscillator (LO), and the responder nodes respond by each transmitting a carrier signal generated by their respective LOs back to the initiator node. In each direction, a phase measurement is performed by the receiving node. The phase measurement may be done by collecting a real, I, and an imaginary, Q, sample (I/Q) from the carrier signal received.

A two-way measurement phase measurement, i.e., a measurement of the round-trip phase advance between a first node and a second node, such as the initiator node and one of the responder nodes, may be performed based on a combination of a phase measurement performed at the second node with the first node transmitting and a phase measurement at the first node with the second node transmitting. With the phase measurement at the second node made with respect to the second node's LO, which is also used for generating the carrier signal transmitted by the second node, and the phase measurement done at the first node made with respect to the first node's LO, which is used for generating the carrier signal transmitted by the first node any phase offset between the respective local oscillators of the two nodes will cancel out when combining the two measurements.

The carrier signals, i.e., constant tones, can either be added to the ends of modulated packets or be sent individually.

This is performed for a plurality of narrow-band frequency channels, where transmissions are performed with respect to all participating nodes before moving on to the next frequency channel, as will be detailed below. Typically, the frequency channels are spread out over the entire frequency band in use, for maximum mitigation of multi-path fading.

With reference to FIG. 2, in a first method example 200, group ranging may be performed in a wireless network between a node A, which for the purposes of the method acts as an initiator node, and a plurality of other nodes, which for the purposes of the method act as responder nodes, here illustrated with three responder nodes B, C, and D.

A measurement procedure 202-208 is performed as a whole, for all responder nodes, in sequence in time, for each frequency channel of a plurality of n+1 frequency channels $ch_i$—wherein i takes on the values k, k+1, k+2, . . . , k+n—before moving to the next frequency channel. The procedure is also illustrated by steps 202, 204, 206, 208, and 210 of FIG. 4. The method example involves a two-way phase measurement between the initiator node A and each of the responder nodes B, C, D, as will be explained in the following.

At the start of the method example 200, the initiator node A may send configuration parameters, such as time slot assignments and a channel hopping map describing an ordering of frequency changes, to the responder nodes B, C, D, and synchronize with all the responder nodes, including symbol-level time synchronization. The synchronization can be done by standard communication in the wireless network, for example both the BLE and TSCH standards provide accurate synchronization between the nodes in the network.

At step 202, during a first timeslot 250, the initiator node A transmits a carrier signal on frequency channel $ch_i$, with each of the responder nodes B, C, and D receiving the carrier signal (indicated in FIG. 2 by "A→*", and in FIG. 4 with a solid-line arrow from node A to node B and with dashed-line arrows from node A to node C and from node A to node D) and performing a respective phase measurement. Thus, the initiator node A broadcasts the carrier signal to the responder nodes B, C, and D.

Thereafter, at step 204, in a following timeslot 252, which may be of the same or of a different length as the first timeslot 250, the responder node B transmits a carrier signal on frequency channel $ch_i$, with the initiator node A receiving the carrier signal (as indicated in FIG. 2 by "B→A" and in FIG. 4 with a solid-line arrow from node B to node A) and performing a phase measurement. Thus, here, the initiator node, exclusively among the plurality of nodes, receives and performs the phase measurement of the carrier signal, the carrier signal thus being unicast by the responder node B to the initiator node A.

Thereafter, at step 206, in a following timeslot, which may be of the same length as the second timeslot 252, the responder node C transmits a carrier signal on frequency channel $ch_i$, with the initiator node A receiving the carrier signal (as indicated in FIG. 2 by "C→A" and in FIG. 4 by a solid line-arrow from node C to node A) and performing a phase measurement. Thus, the initiator node, exclusively among the plurality of nodes, receives and performs the phase measurement of the carrier signal, the carrier signal thus being unicast by the responder node C to the initiator node A.

Thereafter, at step 208, in a following timeslot, which may be of the same length as the second timeslot 252, the responder node D transmits a carrier signal on frequency channel $ch_i$, with the initiator node A receiving the carrier signal (as indicated in FIG. 2 by "D→A" and in FIG. 4 by a solid-line arrow from node D to node A) and performing a phase measurement. Thus, here, the initiator node, exclusively among the plurality of nodes, receives and performs the phase measurement of the carrier signal, the carrier signal thus being unicast by the responder node C to the initiator node A.

Thereafter, at step 210 (FIG. 4), the measurement procedure 202-208 is repeated among nodes A-D for frequency channels $ch_{i=k+1}$, $ch_{i=k+2}$ . . . , which may be ordered according to the channel hopping map. This carries on, as indicated by time interval 254 in FIG. 2, until the measurement procedure is finally performed at frequency channel $ch_{k+n}$.

The phase measurements at each responder node relative to its own LO signal phase are sent to a calculating node, such as the initiator node, so that it can be used as a correction factor by the calculating node. This may be done when the measurement procedure 202-208 has been performed for all the frequency channels, or, alternatively, at the end of each measurement procedure 202-208.

Alternatively, in 202, during each phase measurement in each responder node B, C, D, the respective responder node can adjust its LO by locking it to the received carrier signal. The effect of the locking is that both the phase and frequency of the LO signal at the responder node will be equal to that of the received LO signal of the initiator. This phase will be reflected by transmitted carrier signal by each responder node in steps 204, 206, and 208, so that the phase measured at the initiator node A reflects the round-trip (two-way) phase advance between the initiator node and the respective responder node. Thus, no phase measurement results from the responder nodes need to be sent on, the respective responder node instead using that information locally and it will adjust its own generated RF signal phase.

The distance between the initiator node A and each of the responder nodes B, C, D may be calculated based on the two-way phase measurements between the initiator node A and each of the responder nodes B, C, D for each frequency channel $ch_i$. The calculating node may be the initiator node A, any one of the responding nodes B, C, D or in a different node.

If the distance between one or more of the responding nodes and each of the other nodes is required, the procedure may be repeated using the respective node as initiator node.

With reference to FIG. 3, in a second method 300 example, group ranging may be performed between an initiator node A, which for the purposes of the method acts as an initiator node, and a plurality of other nodes, which for the purposes of the method act as responder nodes, here illustrated with three responder nodes B, C, and D.

A measurement procedure 302-308 is performed as a whole, for all responder nodes, in sequence in time, for each frequency channel of a plurality of n+1 frequency channels $ch_i$—wherein i takes on the values k, k+1, k+2, . . . , k+n—before moving to the next frequency channel. The procedure is also illustrated in steps 302, 304, 305, 306, 307, 308, and 310 of FIG. 4. The method involves a two-way phase measurement between the initiator node A and each of the responder nodes B, C, D, as will be explained in the following.

At the start of the method example 300, the initiator node A may send configuration parameters, such as time slot assignments and a channel hopping map describing an ordering of frequency changes, to the responder nodes B, C, D, and synchronize with all the responder nodes, including symbol-level time synchronization. The synchronization can be done by standard communication in the wireless network, for example both the BLE and TSCH standards provide accurate synchronization between the nodes in the network.

At step 302, in a first timeslot 250, the initiator node A transmits a carrier signal on frequency channel $ch_i$, with the responder receiving the carrier signal nodes (indicated in FIG. 3 by "A→B" and in FIG. 4 with a solid-line arrow from node A to node B) and performing a phase measurement. Thus, the initiator node A unicasts the carrier signal to the responder node B.

Thereafter, at step 304, in a following timeslot 252, which may be of the same or of a different length as the first timeslot 250, the responder node B transmits a carrier signal on frequency channel $ch_i$, with the initiator node A receiving the carrier signal (as indicated in FIG. 3 by "B→A" and in FIG. 4 with a solid-line arrow from node B to node A) and performing a phase measurement. Thus, here, the initiator node, exclusively among the plurality of nodes, receives and performs the phase measurement of the carrier signal, the carrier signal thus being unicast by the responder node B to the initiator node A.

Thereafter, at step 305, in a following timeslot, which may be of the same length as the first timeslot 250, the initiator node A retransmits its carrier signal on frequency channel $ch_i$, with the responder node C receiving the carrier signal (as indicated in FIG. 3 by "A→C" and in FIG. 4 with a solid-line arrow from node A to node C) and performing a phase measurement. Thus, the initiator node A unicasts the carrier signal to the responder node C.

Thereafter, at step 306, in a following timeslot, which may be of the same length as the second timeslot 252, the responder node C transmits a carrier signal on frequency channel $ch_i$, with the initiator node A receiving the carrier signal (as indicated in FIG. 2 by "C→A" and in FIG. 4 by a solid line-arrow from node C to node A) and performing a phase measurement. Thus, the initiator node, exclusively among the plurality of nodes, receives and performs the phase measurement of the carrier signal, the carrier signal thus being unicast by the responder node C to the initiator node A.

Thereafter, at step 307, in a following timeslot, which may be of the same length as the first timeslot 250, the initiator node A retransmits its carrier signal on a frequency channel $ch_i$, with the responder node D receiving the carrier signal (as indicated in FIG. 3 by "A→D" and in FIG. 4 with a solid-line arrow from node A to node D) and performing a phase measurement. Thus, the initiator node A unicasts the carrier signal to the responder node D.

Thereafter, at step 308, in a following timeslot, which may be of the same length as the second timeslot 252, the responder node D transmits a carrier signal on frequency channel $ch_i$, with the initiator node A receiving the carrier signal (as indicated in FIG. 2 by "D→A" and in FIG. 4 by a solid-line arrow from node D to node A) and performing a phase measurement. Thus, here, the initiator node, exclusively among the plurality of nodes, receives and performs the phase measurement of the carrier signal, the carrier signal thus being unicast by the responder node C to the initiator node A.

Thereafter, at step 310 (FIG. 4), the measurement procedure 302-310 is repeated by nodes A-D on frequency channels $ch_{i=k+1}$, $ch_{i=k+2}$ . . . , . . . , which may be ordered according to the channel hopping map. This carries on, as indicated by time interval 254 in FIG. 3, until the measurement procedure is finally performed at frequency channel $ch_{k+n}$.

The phase measurements at each responder node relative to its own LO signal phase are sent to a calculating node, such as the initiator node, so that it can be used as a correction factor by the calculating node. This may be done when the measurement procedure 302-310 has been performed for all the frequency channels, or, alternatively, at the end of each measurement procedure 302-310.

Alternatively, in steps 302, 305, and 307, during each phase measurement in each respective responder node B, C, D, the respective responder node can adjust its LO by locking it to the received carrier signal. The effect of the locking is that both the phase and frequency of the LO signal at the responder node will be equal to that of the received LO signal of the initiator. This phase will be reflected by each transmitted carrier signal by each respective responder node in steps 304, 306, and 308, so that the phase measured at the initiator node A reflects the round-trip (two-way) phase advance between the initiator node and the respective responder node. Thus, no phase measurement results from the responder nodes need to be sent on, the respective responder node instead using that information locally and it will adjust its own generated RF signal phase.

The distance between the initiator node A and each of the responder nodes B, C, D may be calculated based on the respective two-way phase measurements between the initiator node A and each of the responder nodes B, C, D for each frequency channel $ch_i$. The calculating node may be the initiator node A, any one of the responding nodes B, C, D or in a different node.

Again with reference to FIG. 2, in a third method example, which is a variant of the first method example 200, group ranging may be performed in a wireless network between all participating nodes, including a node A, which for the purposes of the method acts as an initiator node, and a plurality of other nodes, which for the purposes of the method act as responder nodes, here illustrated with three responder nodes B, C, and D.

A measurement procedure 202-208 is performed as a whole, for all responder nodes, in sequence in time, for each frequency channel of a plurality of n+1 frequency channels $ch_i$, wherein i takes on the values k, k+1, k+2, . . . , k+n, before moving to the next frequency channel. The procedure is also illustrated in steps 202, 204, 206, 208, and 210 of FIG. 4.

The method involves a two-way phase measurement between each of the nodes A, B, C, D and each other node. Thus, it not only involves two-way phase measurements between the initiator node and each of the responder nodes, but also between each responder node and each other responder node. As will be detailed in the following, the initiator node broadcasts a carrier signal to all responder nodes B, C, D. After performing phase measurements, the responder nodes in turn each broadcasts a respective carrier signal to the initiator and to the other responder nodes. This is in contrast to the first and second method examples described above, where each responder node only unicasts its carrier to the initiator node with only the initiator being scheduled to listen to the carrier signals from the responding nodes. Therefore, the other devices do not need to repeat the ranging to estimate their distance with their neighbors.

At the start of the method example, the initiator node A may send configuration parameters, such as time slot assignments and a channel hopping map describing an ordering of frequency changes, to the responder nodes B, C, D, and synchronize with all the responder nodes, including symbol-level time synchronization. The synchronization can be done by standard communication in the wireless network, for example both the BLE and TSCH standards provide accurate synchronization between the nodes in the network.

At step 202, during a first timeslot 250, the initiator node A transmits a carrier signal on frequency channel $ch_i$, with each of the responder nodes B, C, and D receiving the carrier signal (indicated in FIG. 2 by "A→*", and in FIG. 4 with a solid-line arrow from node A to node B and with dashed-line arrows from node A to node C and from node A to node D) and performing a phase measurement. Thus, the initiator node A broadcasts the carrier signal to the responder nodes B, C, and D.

Thereafter, at step 204, in a following timeslot 252, which may be of the same or of a different length as the first timeslot 250, the responder node B transmits a carrier signal on frequency channel $ch_i$, with the initiator node A and the responder nodes C and D receiving the carrier signal (as indicated in FIG. 2 by "B→*" and in FIG. 4 with a solid-line arrow from node B to node A and dashed-line arrows from node B to node C and from node B to node D) and performing a phase measurement. Thus, the responder node B broadcasts the carrier signal to initiator node A and the other responder nodes C and D.

Thereafter, at step 206, in a following timeslot, which may be of the same length as the second timeslot 250, the responder node C transmits a carrier signal on frequency channel $ch_i$, with the initiator node A and the responder nodes B and D receiving the carrier signal (as indicated in FIG. 2 by "C→*" and in FIG. 4 with a solid-line arrow from node C to node A and dashed-line arrows from node C to node B and from node C to node D) and performing a phase measurement. Thus, the responder node C broadcasts the carrier signal to initiator node A and the other responder nodes B and D.

Thereafter, at step 208, in a following timeslot, which may be of the same length as the second timeslot 250, the responder node D transmits a carrier signal on frequency channel $ch_i$, with the initiator node A and the responder nodes B and C receiving the carrier signal (as indicated in FIG. 2 by "D→*" and in FIG. 4 with a solid-line arrow from node D to node A and dashed-line arrows from node D to node B and from node C to node C) and performing a phase measurement. Thus, the responder node D broadcasts the carrier signal to initiator node A and the other responder nodes B and C.

Thereafter, at step 210 (FIG. 4), the measurement procedure 202-208 is repeated by nodes A-D on frequency channels $ch_{i=k+1}$, $ch_{i=k+2}$ . . . , which may be ordered according to the channel hopping map. This carries on, as indicated by time interval 254 in FIG. 2, until the measurement procedure is finally performed at frequency channel $ch_{k+n}$.

The phase measurements at each responder node relative to its own LO signal phase may be broadcast by each respective responder node to the other nodes, so that all other nodes may calculate their respective distance to that node. This broadcasting may be done when the measurement procedure 202-208 has been performed for all the frequency channels, or, alternatively, at the end of each measurement procedure 202-208.

Alternatively, all measurement results may be sent to a calculating node, such as the initiator node, so that it can be used as a correction factor by the calculating node. This may be done when the measurement procedure 202-208 has been performed for all the frequency channels, or, alternatively, at the end of each measurement procedure 202-208. The calculating node may be the initiator node A, any one of the responding nodes B, C, D or in a different node.

The distances between each of the nodes A, B, C, D may be calculated based on the respective two-way phase measurements performed with between them as described above for each frequency channel $ch_i$. Thus, the calculation not only involves calculating the distance between the initiator node A and each of the responder nodes B, C, D, but also calculating the distance between each responder node and each other responder node.

Generally, setting of each frequency channel $ch_i$ may be performed in a MAC layer and/or a data-link layer of the wireless network. In particular, some standards and protocols, such as BLE and TSCH, utilize their own channel hopping techniques to cover the entire frequency band used. For example, BLE uses pseudo-random frequency hopping sequences for communication to mitigate effects of multi-path fading and external interference. Such standard-based channel hopping schemes may be used for setting each frequency channel $ch_i$, for example by the initiator node, before transmitting the carrier signal from each respective node.

Generally, the respective defined timeslots during which each responder node transmits its carrier signal may either be assigned in a centralized manner by the or in a fully distributed manner by the responder nodes themselves. In the former case, the respective defined timeslots may be assigned by an assigning node, such as the initiator node, and communicated to the responder node before starting the measurement procedure, for instance by communicating a time offset during a hand-shake mechanism right before starting the measurement procedure.

Alternatively, the respective defined timeslots may be defined based on a hardware address of the respective responder node. For example the time offset for each responder node to send back its carrier can be equal to, for instance, hash(MAC) % N where MAC is the hardware or link layer address of the responder node, and N is the number of timeslots to be scheduled, and hash( ) is some hash function. Alternatively, both the hardware address of the responder node and the hardware address of the initiator node may be input to the hash function.

The initiator node and the responder nodes will each know beforehand the hardware addresses of the responder nodes to which they transmit or from which they receive the carrier signal, and/or may exchange the hardware addresses before starting ranging. Thus, both the transmitting node and the receiving node may use the hash function to assign the timeslot during which to receive or transmit. Collisions may be handled by a collision handling scheme, such as a Slotted-Aloha scheme. If using the Slotted-Aloha mechanism, the timeslots are shared between responder nodes. They will compete with each other to choose a timeslot while a back-off procedure will help to avoid collision.

Figure 5:
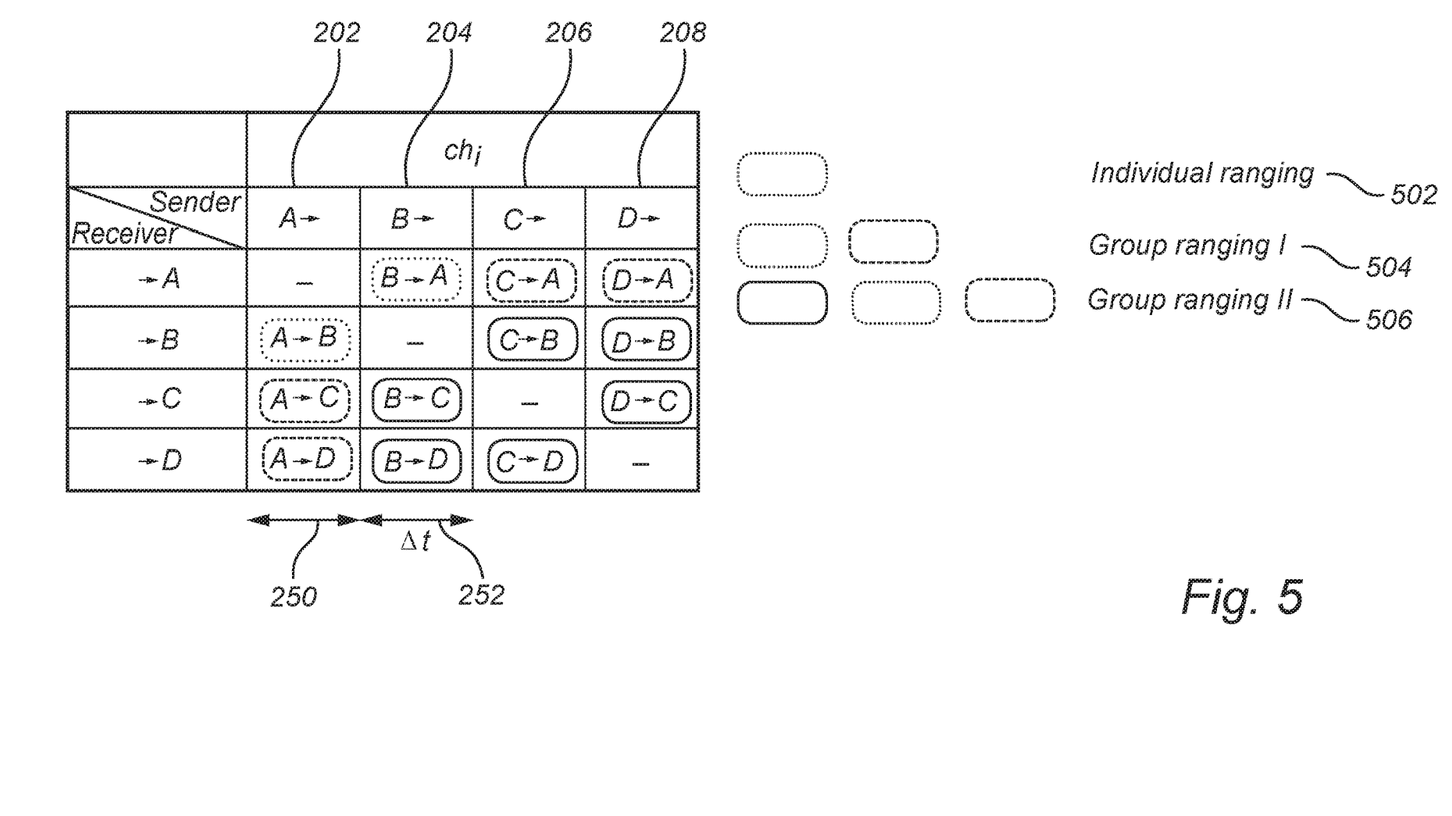
FIG. 5 summarizes the transmission patterns of the first, second, and third ranging method, according to an example embodiment.

FIG. 5 summarizes as a table the different possible transmission patterns.

With dotted lines is shown individual ranging 502 (not according to the present example embodiment) in which, for a specific frequency channel $ch_i$, in subsequent respective timeslots 250 and 252, the initiator node A transmits and the responder node B receives, "A→B", and, then, the responder node B transmits and the initiator node A receives.

With dotted lines and dashed lines is shown ranging 504, marked "Group ranging I", in which, for a specific frequency channel $ch_i$, first, in a timeslot 250, the initiator node A transmits (broadcasts) and the responder nodes B, C, and D receive: "A→B", "A→C", and "A→C", and, then, in a subsequent timeslot 252, the responder node B transmits (unicasts) and the initiator node A receives, "B→A", and, then, in sequence, the responder node C transmits (unicasts) and the initiator node A receives, "C→A", and the responder node D transmits (unicasts) and the initiator node A receives, "D→A". This corresponds to the first method example 200 described above.

With dotted lines, dashed lines, and solid lines is shown group ranging 506, marked "Group ranging II", in which, for a specific frequency channel $ch_i$, first, in a timeslot 250, the initiator node A transmits (broadcasts) and the responder nodes B, C, and D receive: "A→B", "A→C", and "A→C", and, then, in a subsequent timeslot 252, the responder node B transmits (broadcasts) and the initiator node A and the other responder nodes C and D receive: "B→A", "B→C", and "B→D", and, then, in sequence, the responder node C transmits (broadcasts) and the initiator node A and the other responder nodes B and D receive: "C→A", "C→B", and "C→D", the responder node C transmits (broadcasts) and the initiator node A and the other responder nodes B and C receive: "D→A", "D→B", and "D→C"". This corresponds to the third method example described above.

Figure 1:
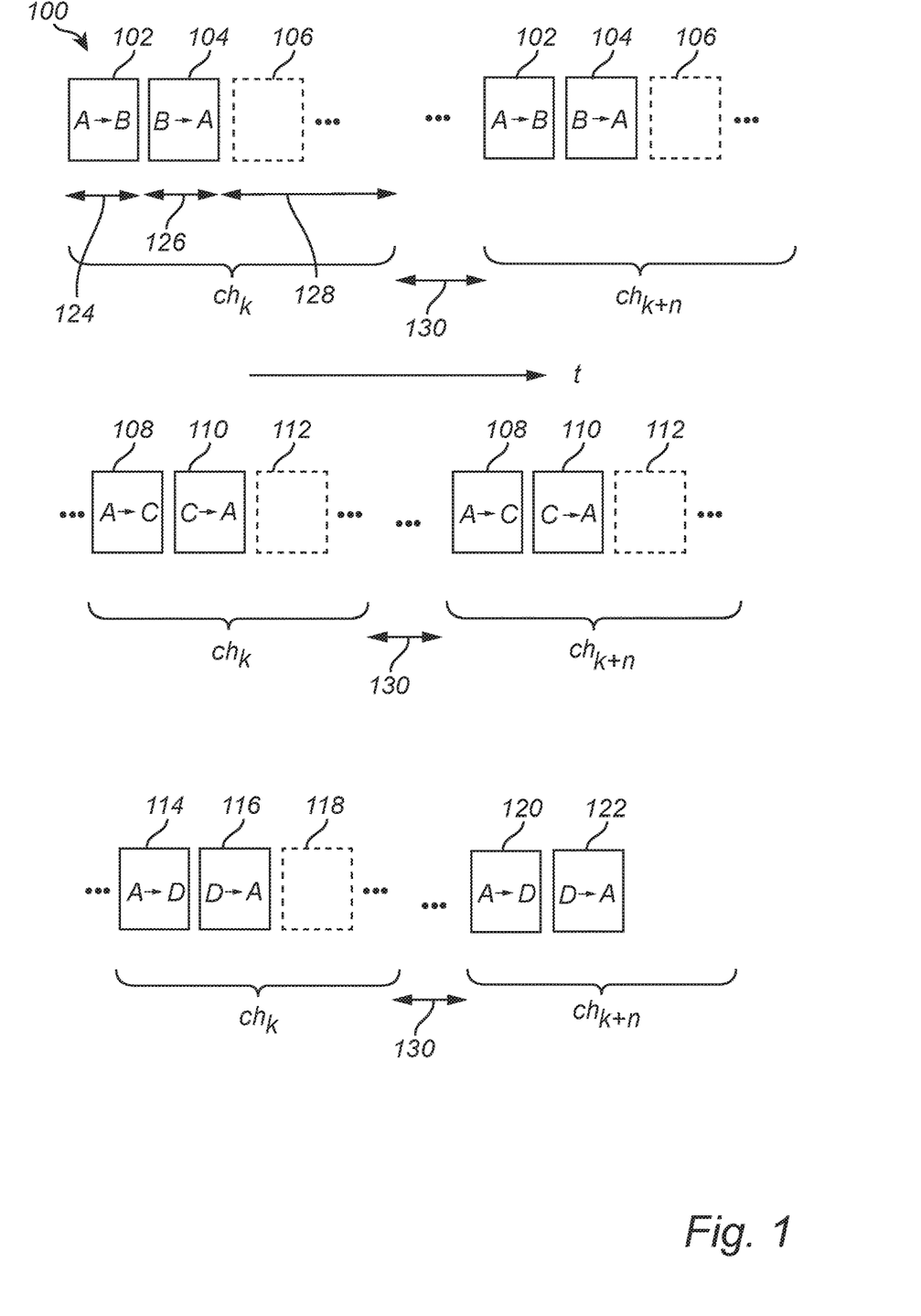
FIG. 1 shows, for comparison purposes, schematically, the timing sequence of a ranging method example not according to the present example embodiments.

As a comparison, FIG. 1 shows a method example 100 where, contrary to the present example embodiments, for each frequency channel $ch_i$, ranging is only performed between one initiator node and one responder node at a time.

Ranging is performed in a wireless network between a node A, which for the purposes of the method acts as an initiator node, and a plurality of other nodes, which for the purposes of the method act as responder nodes, here illustrated with three responder nodes B, C, and D.

At 102, during a first timeslot 124, the initiator node A transmits a carrier signal on frequency channel $ch_k$, with the responder node receiving the carrier signal (indicated by "A→B") and performing a phase measurement. Thus, the initiator node A unicasts the carrier signal to the responder nodes B.

Thereafter, at 104, in a following timeslot 126, which may be of the same or of a different length as the first timeslot 124, the responder node B transmits a carrier signal on frequency channel $ch_k$, with the initiator node A receiving the carrier signal (as indicated by "B→A") and performing a phase measurement, the carrier signal thus being unicast by the responder node B to the initiator node A.

Thereafter, the frequency channel is switched to $ch_{k+1}$ during a switching interval 128, during which time slots 106 cannot be used for due to the time delay caused by switching frequency channel. The procedure at 102 and 104 is repeated for other frequency channels $ch_{k+1}$, and then for channels $ch_{k+2}$, $ch_{k+3}$, $ch_{k+n}$.

Thereafter, ranging is performed in the same way, for all frequency channels, between the initiator node A and the responder node C, at 108 and 110, and thereafter, between the initiator node A and the responder node C, at 114 and 116.

Thus, the number of frequency switches is n times the number of participating responder nodes, as compared with n times for the first, second, and third methods described above. At each frequency switch, there are unusable timeslots 106, 112, and 118.

In the above, the example embodiments have mainly been described with reference to a limited number of examples. However, as is readily appreciated by a person skilled in the art, other examples than the ones disclosed above are equally possible within the scope of the disclosure, as defined by the appended claims.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method for group ranging in a wireless network, the wireless network comprising a plurality of nodes, the plurality of nodes for the purposes of the method comprising an initiator node and a plurality of responder nodes, the method comprising:

performing, as a whole, in sequence in time, for each frequency in a plurality of frequencies, a measurement procedure involving a two-way phase measurement between the initiator node and each of the responder nodes, the measurement procedure comprising:

the initiator node transmitting a carrier signal having the frequency, each responder node of the plurality of responder nodes receiving and performing a phase measurement of the carrier signal;

each responder node of the plurality of responder nodes, during a respective defined timeslot, transmitting a carrier signal having the frequency, the initiator node receiving and performing a phase measurement of the carrier signal; and determining a two-way phase measurement between each responder node and each other responder node of the plurality of nodes, wherein the two-way phase measurement comprises, during each responder node of the plurality of responder nodes transmitting the carrier signal, each other responder node of the plurality of responder nodes receiving and performing a phase measurement of the carrier signal from the responder node; the method further comprising:

calculating, between the initiator node and each responder node of the plurality of responder nodes, a distance, based on the performed two-way phase measurements involving the initiator node and the responder node; and calculating, between each responder node and each other responder node of the plurality of responder nodes, a distance, based on the performed two-way phase measurement involving the responder node and the other responder node.

2. The method of claim 1, wherein, during each responder node of the plurality of responder nodes transmitting the carrier signal, the initiator node, exclusively among the plurality of nodes, receives and performs the phase measurement of the carrier signal.

3. The method of claim 1, wherein:
during the initiator node transmitting the carrier signal, each of the responder nodes locks its local oscillator, LO, to the carrier signal based on the phase measurement.

4. The method of claim 1, wherein, immediately ahead of each respective defined timeslot, the initiator node retransmits the carrier signal.

5. The method of claim 4, wherein the respective defined timeslot is assigned by the initiator node, and communicated to the responder node.

6. The method of claim 4, wherein the respective defined timeslot is defined based on a hardware address of the responder node.

7. The method of claim 4, wherein use of the respective defined timeslot is based on a collision-handling scheme, such as a Slotted-Aloha scheme.

8. The method of claim 1, wherein setting of each frequency of the plurality of frequencies is performed in a MAC layer and/or a data-link layer of the wireless network.

9. The method of claim 1, wherein the wireless network is a Bluetooth Low Energy, BLE, network or a Time Slotted Channel Hopping, TSCH, network.

10. The method of claim 1, wherein the sequence of time corresponds to a sequence of frequency channels.

11. A wireless network node configured to participate in a group ranging procedure in a wireless network, the wireless network node being configured to:perform, as a whole, in sequence in time, for each frequency in a plurality of frequencies, a measurement procedure comprising: transmitting a carrier signal having the frequency; receiving from each responder node of a plurality of responder nodes in the wireless network, during a respective defined timeslot, a carrier signal having the frequency; performing, for each responder node of a plurality of responder nodes, a phase measurement of the carrier signal; and calculating, between the wireless network node and each other responder node of the plurality of responder nodes, a distance, based on the performed phase measurement involving the wireless network node and the other responder node.

12. A system comprising:
a wireless network node configured to participate in a group ranging procedure in a wireless network, the wireless network node being configured to:
perform, as a whole, in sequence in time, for each frequency in a plurality of frequencies, a measurement procedure comprising:
receiving from an initiator node of the wireless network, a carrier signal having the frequency and performing a phase measurement of the carrier signal;
during a respective defined timeslot, transmitting a carrier signal having the frequency; and
determining a two-way phase measurement between each responder node and each other responder node of the plurality of nodes, wherein the two-way phase measurement comprises, during each responder node of the plurality of responder nodes transmitting the carrier signal, each other responder node of the plurality of responder nodes receiving and performing a phase measurement of the carrier signal from the responder node, wherein the initiator node is configured to:
calculate, between each responder node and each other responder node of the plurality of responder nodes, a distance, based on the performed two-way phase measurement involving the responder node and the other responder node.

13. The system of claim 12, wherein, during each responder node of the plurality of responder nodes transmitting the carrier signal, the initiator node, exclusively among the plurality of nodes, receives and performs the phase measurement of the carrier signal.

14. The system of claim 12, wherein:
during the initiator node transmitting the carrier signal, each of the responder nodes locks its local oscillator, LO, to the carrier signal based on the phase measurement.

15. The system of claim 12, wherein, immediately ahead of each respective defined timeslot, the initiator node retransmits the carrier signal.

16. The system of claim 15, wherein the respective defined timeslot is assigned by the initiator node, and communicated to the responder node.

17. The system of claim 15, wherein the respective defined timeslot is defined based on a hardware address of the responder node.

18. The system of claim 15, wherein use of the respective defined timeslot is based on a collision-handling scheme, such as a Slotted-Aloha scheme.

19. The system of claim 12, wherein setting of each frequency of the plurality of frequencies is performed in a MAC layer and/or a data-link layer of the wireless network.

20. The system of claim 12, wherein the phase measurements at each responder node are relative to an LO signal phase corresponding to the responder node.

* * * * *